US012435548B2

(12) United States Patent
Jung et al.

(10) Patent No.: US 12,435,548 B2
(45) Date of Patent: Oct. 7, 2025

(54) DOOR HANDLE EMERGENCY EXTENSION SYSTEM FOR VEHICLE AND CONTROL METHOD THEREOF

(71) Applicant: HYUNDAI MOBIS CO., LTD., Seoul (KR)

(72) Inventors: Dae Chang Jung, Yongin-Si (KR); Seok Hoon Ko, Yongin-si (KR); Seok Min Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 169 days.

(21) Appl. No.: 18/347,706

(22) Filed: Jul. 6, 2023

(65) Prior Publication Data

US 2024/0011334 A1 Jan. 11, 2024

(30) Foreign Application Priority Data

Jul. 7, 2022 (KR) ........................ 10-2022-0083845

(51) Int. Cl.
*E05B 77/12* (2014.01)
*E05B 5/00* (2006.01)
(Continued)

(52) U.S. Cl.
CPC .............. *E05B 77/12* (2013.01); *E05B 5/003* (2013.01); *E05B 5/006* (2013.01); *E05B 81/56* (2013.01);
(Continued)

(58) Field of Classification Search
CPC .... Y10S 292/31; Y10S 292/65; Y10S 292/66; E05B 51/023; E05B 65/0082;
(Continued)

(56) References Cited

U.S. PATENT DOCUMENTS 5,727,288 A * 3/1998 Byon .................... E05B 51/023 16/221
6,851,372 B2 * 2/2005 Bender ................. F15B 15/261 89/1.14
(Continued)

FOREIGN PATENT DOCUMENTS

CN 105874135 A 8/2016
CN 114382357 A 4/2022
(Continued)

OTHER PUBLICATIONS

Office Action issued on Aug. 20, 2025 in corresponding Chinese patent application No. 202310831990.2.

*Primary Examiner* — Carlos Lugo
(74) *Attorney, Agent, or Firm* — NovoTechIP International PLLC

(57) ABSTRACT

The present invention is configured to include a first energy-amplifying actuator configured to release a door locking mechanism by outputting energy greater than the energy received, a second energy-amplifying actuator configured to extend a door handle from a door by outputting energy greater than the energy received, a controller equipped to drive the first energy-amplifying actuator and the second energy-amplifying actuator when the vehicle stopped moving is in a state where the door handle is not extended normally to facilitate opening the door, and an emergency power supply equipped to supply power to the controller independently of the vehicle power supply device.

10 Claims, 6 Drawing Sheets

(51) Int. Cl.

| | |
|---|---|
| ***E05B 5/02*** | (2006.01) |
| ***E05B 81/56*** | (2014.01) |
| ***E05B 81/64*** | (2014.01) |
| ***E05B 83/36*** | (2014.01) |
| ***E05B 85/10*** | (2014.01) |

(52) U.S. Cl.
CPC .............. *E05B 81/64* (2013.01); *E05B 83/36* (2013.01); *E05B 85/103* (2013.01)

(58) Field of Classification Search
CPC ...... E05B 85/10; E05B 85/103; E05B 85/107; E05B 77/12; E05B 77/30; E05B 17/0062
USPC ......................... 60/632; 292/201, 216, 336.3
See application file for complete search history.

(56) References Cited

U.S. PATENT DOCUMENTS

| | | | | |
|---|---|---|---|---|
| 9,103,143 | B2 | 8/2015 | Wheeler et al. | |
| 2007/0013197 | A1* | 1/2007 | Bender | E05B 51/023 60/512 |
| 2016/0333614 | A1* | 11/2016 | Bendel | E05B 53/001 |
| 2019/0169889 | A1* | 6/2019 | Beck | E05B 77/02 |

FOREIGN PATENT DOCUMENTS

| | | | | |
|---|---|---|---|---|
| DE | 19847079 | A1 * | 4/2000 | E05B 51/023 |
| DE | 19947363 | A1 * | 4/2001 | E05B 77/12 |
| DE | 202006016764 | U1 * | 2/2007 | A62B 3/005 |
| DE | 102006035694 | A1 * | 1/2008 | B60R 21/38 |
| DE | 102005003932 | B4 * | 9/2009 | E05B 77/02 |
| DE | 102019104656 | A1 * | 8/2020 | |
| DE | 102020129038 | A1 * | 5/2022 | E05B 77/02 |
| FR | 3081485 | A1 * | 11/2019 | E05B 51/023 |
| KR | 10-2013-0058212 | A | 6/2013 | |

* cited by examiner

DOOR HANDLE EMERGENCY EXTENSION SYSTEM FOR VEHICLE AND CONTROL METHOD THEREOF

CROSS-REFERENCE TO RELATED APPLICATIONS

The present application claims priority to Korean Patent Application No. 10-2022-0083845, filed Jul. 7, 2022, the entire content of which is incorporated herein for all purposes by this reference.

TECHNICAL FIELD

The present invention relates to a technology pertaining to a door handle capable of opening and closing a door of a vehicle.

BACKGROUND

Vehicles are equipped with doors that allow users to get in and out, and these doors have door handles to facilitate the opening and closing of the doors for users.

Moreover, the doors are furnished with door lock mechanisms that prevent the door from being unlocked even when the door handle is manipulated, ensuring that the locked state of the door is not released.

Recently, electronic door handles have become more common in vehicles, considering factors such as security and aesthetic design, instead of traditional mechanical door handles, and these electronic door handles are retracted inside the door during driving or power-off situations and extended outward for user convenience when the vehicle stops moving or the power is turned on.

However, in emergency situations such as car accidents, if the power supply to the electronic door handles is cut off and the handles do not extend even though the vehicle stops moving, this may prevent quick door opening, resulting in a failure to take appropriate evacuation and rescue measures for the passengers promptly.

The foregoing is intended merely to aid in the understanding of the background of the present invention, and is not intended to mean that the present invention falls within the purview of the related art that is already known to those skilled in the art.

SUMMARY

The present invention aims to provide a door handle emergency extension system and control method thereof that allows quick and easy door opening by extending the door handles retracted inside the vehicle's doors in addition to releasing the door lock mechanism in the event of accidents such as fire and collision, thereby allowing prompt evacuation and rescue of passengers.

In order to accomplish the above object, a door handle emergency extension system of a vehicle according to the present invention includes a first energy-amplifying actuator installed to release a door locking mechanism by outputting energy greater than the energy received, a second energy-amplifying actuator installed to extend a door handle from a door by outputting energy greater than the energy received, a controller equipped to drive the first energy-amplifying actuator and the second energy-amplifying actuator when the vehicle stopped moving is in a state where the door handle is not extended normally to facilitate opening the door, and an emergency power supply equipped to supply power to the controller independently of the vehicle power supply device.

The first energy-amplifying actuator may include a first pyro device installed to generate explosive power based on an electrical signal provided by the controller to release the door locking mechanism.

The second energy-amplifying actuator may include a second pyro device installed to generate explosive power based on an electric signal provided by the controller to extend the door handle.

The controller may include a stop confirmation sensor capable of confirming the stop state of the vehicle.

The stop confirmation sensor may include at least one of an acceleration sensor and a gyro sensor that measure the presence or absence of movement of the vehicle.

The controller may be connected to the vehicle power supply and configured to operate, based on being able to receive power normally from the vehicle power supply, with the power from the vehicle power supply and, based on being unable to receive power normally from the vehicle power supply, with the power from the emergency power supply.

The controller may be configured to determine, in response to receiving information on the occurrence of a collision accident of the vehicle in motion, whether the vehicle is in a stopped state based on a signal from the stop confirmation sensor and drive, in response to the vehicle being in the stopped state, the first energy-amplifying actuator and the second energy-amplifying actuator.

The controller may be configured to set, in response to receiving information on abnormality in the vehicle power supply of the vehicle in motion, an expected stopping time of the vehicle based on the current speed of the vehicle, determine, in response to being unable to use the power of the vehicle power supply at a time point after the expected stopping time elapses, whether the vehicle has stopped moving based on a signal of the stop confirmation sensor, and drive, in response to the vehicle having stopped moving, the first energy amplification actuator and the second energy amplification actuator.

The second pyro device may include a latch mechanism configured to maintain, in response to the door handle being extended from the door, the door handle in an extended state.

Also, in order to accomplish the above object, a method of controlling a vehicle door handle emergency extension system of a vehicle includes monitoring whether a collision accident occurs while the vehicle is in motion, determining, in response to the occurrence of a collision accident, whether the vehicle is in a stopped state, and releasing a door lock mechanism and extending a door handle from a door, in response to the vehicle being in a stopped state, by driving a first energy-amplifying actuator and a second energy-amplifying actuator.

Monitoring whether a collision accident occurs may include determining whether a collision accident occurs based on a signal of a shock sensor of an airbag system of the vehicle being received through an in-vehicle network.

Determining whether the vehicle is in a stopped state may include determining whether the vehicle is in a stopped state based on a combination of at least one signal of an acceleration sensor and a gyro sensor installed in a controller.

Also, in order to accomplish the above object, a method of controlling a door handle emergency extension system of a vehicle includes monitoring whether at least one abnormality occurs in a vehicle power supply, setting, in response to an abnormality occurring in the vehicle power supply, an expected stopping time of the vehicle based on current speed of the vehicle, determining whether using power of the vehicle power supply is unavailable at a time point after the expected stopping time of the vehicle elapses, determining, in response to using power of the vehicle power supply being unavailable, whether the vehicle is in a stopped state, and driving, in response to the vehicle is in a stopped state, a first energy amplification actuator and a second energy amplification actuator.

The expected stopping time of the vehicle based on the current speed of the vehicle may be set to increase proportionally with the speed magnitude of the vehicle.

The method may further include resetting, in response to using the power of the vehicle power supply being available at the time point after the expected stopping time of the vehicle elapses, the expected stopping time of the vehicle based on the current speed of the vehicle.

The method may further include switching, in response to using power of the vehicle power supply being unavailable, the operating power of the controller to an emergency power supply.

The present invention is advantageous in term of allowing quick and easy door opening in emergency situations such as fires or collisions by releasing the door lock mechanism and extending the door handles retracted inside the vehicle door, allowing for prompt evacuation and rescue of passengers.

DETAILED DESCRIPTION

Figure 1:
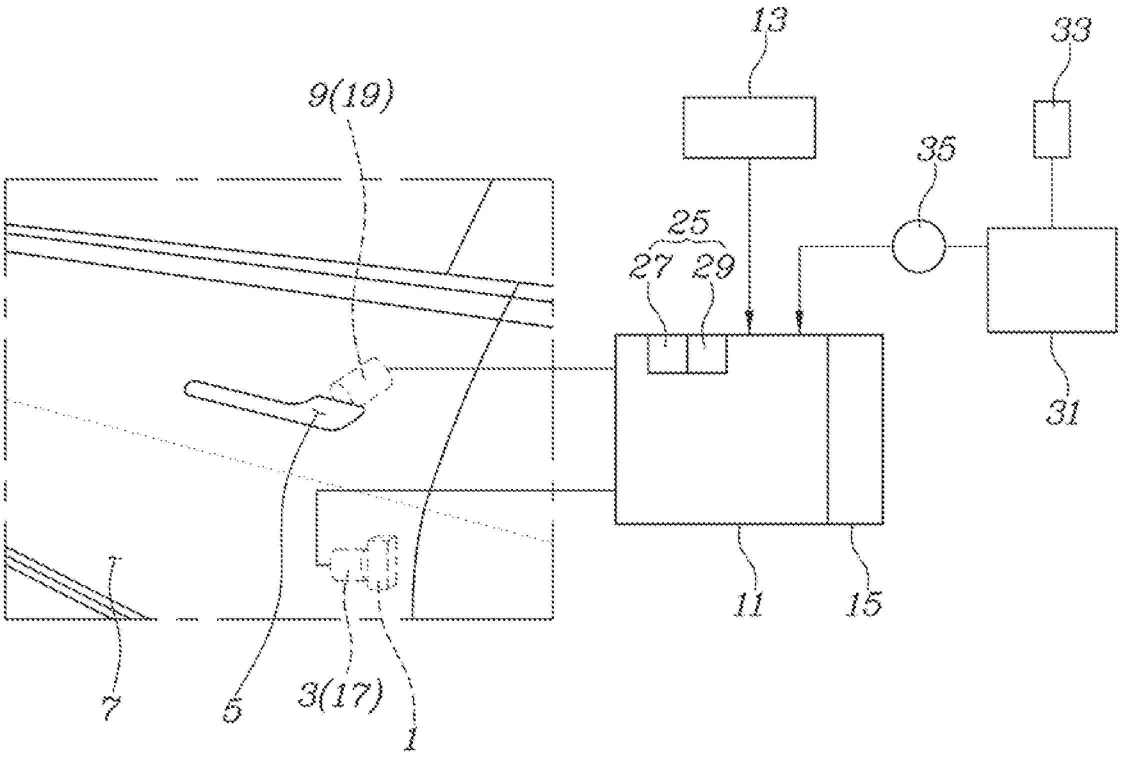
FIG. 1 is a configuration diagram of a door handle emergency release system of a vehicle according to the present invention.

Hereinafter, descriptions are made of the embodiments disclosed in the present specification with reference to the accompanying drawings in which the same reference numbers are assigned to refer to the same or like components and redundant description thereof is omitted.

As used in the following description, the suffix "module" and "unit" are granted or used interchangeably in consideration of easiness of description but, by itself, having no distinct meaning or role.

In addition, detailed descriptions of well-known technologies related to the embodiments disclosed in the present specification may be omitted to avoid obscuring the subject matter of the embodiments disclosed in the present specification. In addition, the accompanying drawings are only for easy understanding of the embodiments disclosed in the present specification and do not limit the technical spirit disclosed herein, and it should be understood that the embodiments include all changes, equivalents, and substitutes within the spirit and scope of the disclosure.

As used herein, terms including an ordinal number such as "first" and "second" can be used to describe various components without limiting the components. The terms are used only for distinguishing one component from another component.

It will be understood that when a component is referred to as being "connected to" or "coupled to" another component, it can be directly connected or coupled to the other component or intervening component may be present. In contrast, when a component is referred to as being "directly connected to" or "directly coupled to" another component, there are no intervening component present.

As used herein, the singular forms are intended to include the plural forms as well, unless the context clearly indicates otherwise.

It will be further understood that the terms "comprises" or "has," when used in this specification, specify the presence of a stated feature, number, step, operation, component, element, or a combination thereof, but they do not preclude the presence or addition of one or more other features, numbers, steps, operations, components, elements, or combinations thereof.

In addition, a unit or control unit included in the names of a Motor Control Unit (MCU), a Hybrid Control Unit (HCU), etc. is only a term in use widely for designating a controller that controls a specific function of a vehicle but does not mean a generic function unit.

For example, each controller may include a communication device communicating with another controller or sensor to control a function in charge, a memory that stores operating system or logic instructions and input/output information, and one or more processors for determination, operation, and decision-making necessary for functions in charge.

With reference to FIGS. 1 to 4, a door handle emergency extension system for a vehicle according to an embodiment of the present invention includes a first energy-amplifying actuator 3 configured to release the door lock mechanism 1 by outputting energy greater than the received energy, a second energy-amplifying actuator 9 configured to extend the door handle 5 from the door 7 by outputting energy greater than the received energy, a controller 11 equipped to operate the first energy-amplifying actuator 3 and the second energy-amplifying actuator 9 when the vehicle comes to a state where the door handle 5 cannot be extended normally to help open the door 7, and an emergency power supply 15 equipped to supply power to the controller 11 independently of the vehicle power supply 13.

That is, the present invention aims to facilitate prompt evacuation and rescue of passengers by forcibly releasing the door lock mechanism 1 and extending the door handle 5 from the door 7 using the first energy-amplifying actuator 3 and the second energy-amplifying actuator 9, allowing for easy opening of the door 7 when the controller 11 fails to extend the door handle 5 normally in a situation where the vehicle stopped moving cannot open the door 7 easily.

In this embodiment, the first energy-amplifying actuator 3 is composed of a first pyro device 17 that generates explosive power to release the door lock mechanism 1 when an electrical signal is received from the controller 11.

In addition, the second energy-amplifying actuator 9 is composed of a second pyro device 19 that generates explosive power to push out the door handle 5 from the door 7 when an electrical signal is received from the controller 11.

The first pyro device 17 and the second pyro device 19 may generate sufficient mechanical displacement by the explosion of internal explosives in response to weak electrical signals provided by the controller 11, allowing the release of the door lock mechanism 1 and protrusion of the door handle 5, even in situations where power supply from the vehicle power supply 13 is not cut off due to accidents or other reasons.

The first pyro device 17 may be considered an example of the first energy-amplifying actuator 3 in that it amplifies energy from weak electrical signals provided by the controller 11 and generates amplified energy sufficient for mechanical displacement for release of the door lock mechanism 1 as described above.

In addition, the second pyro device 19 may be considered as an example of the second energy-amplifying actuator 9 in that it amplifies energy from weak electrical signals provided by the controller 11 and generates amplified energy sufficient for mechanical displacement for protrusion of the door handle 5 retracted in the door 7 as described above.

Figure 2:
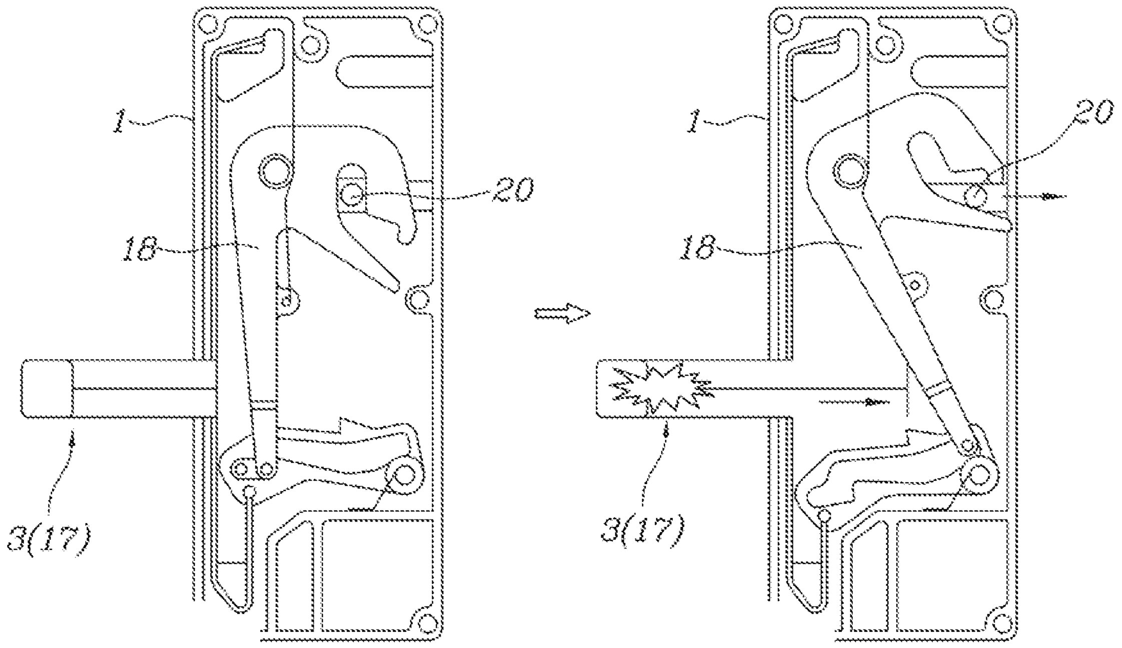
FIG. 2 is a diagram illustrating a principle of releasing a first pyro device of a door lock mechanism.

The first pyro device 17 may be configured to release the locked state of the door 7 by forcibly rotating a door lock lever 18 of the door lock mechanism 1 by explosion, as shown in FIG. 2, so that a door lock ring 20 fixed to the body may be detached from the door lock mechanism 1 fixed to the door 7.

Figure 3:
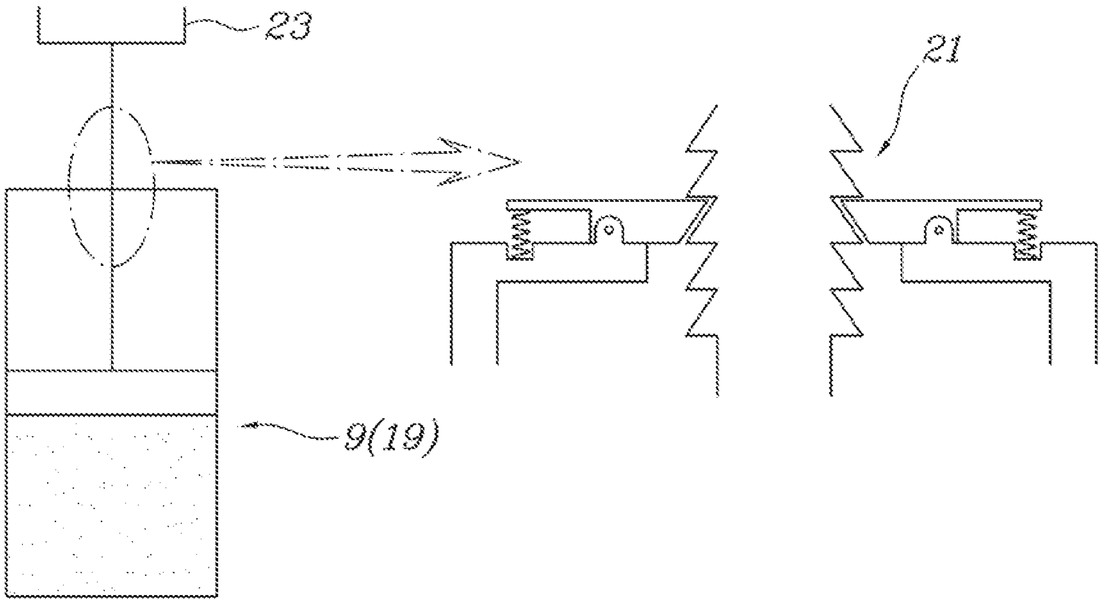
FIG. 3 is a diagram illustrating a structure of a second pyro device.
Figure 4:
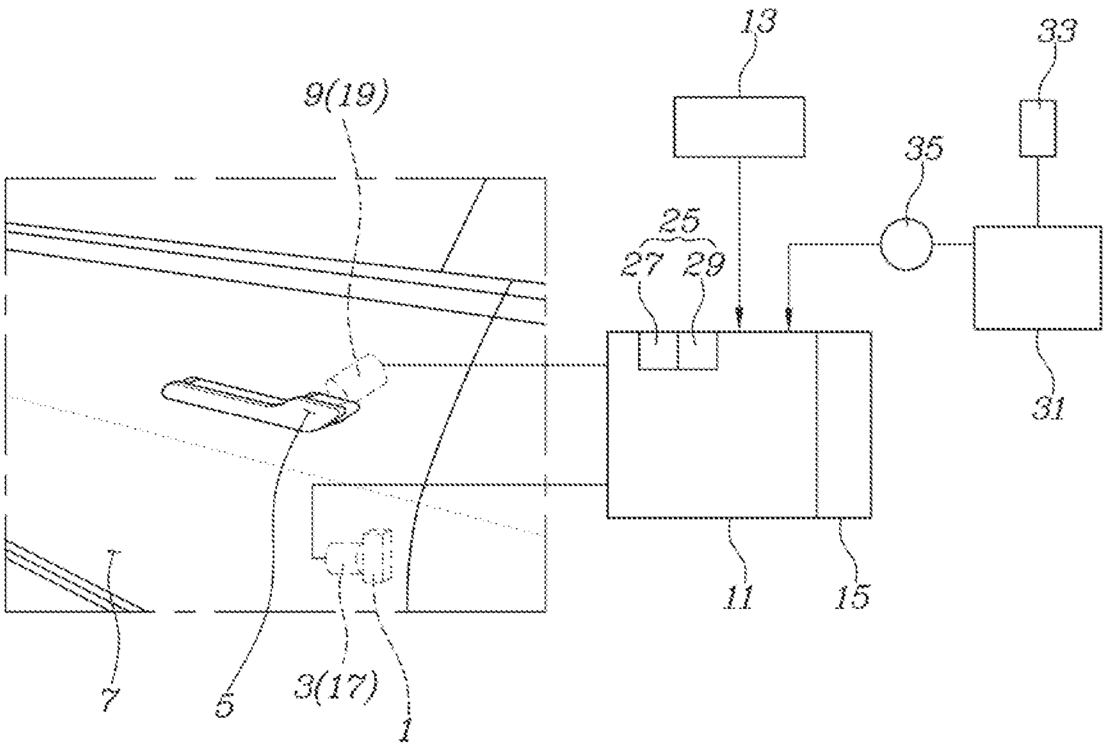
FIG. 4 is a diagram illustrating a door handle of a vehicle in a state extended from a door in contrast to FIG. 1.

Meanwhile, the second pyro device 19 may be equipped with a latch mechanism 21 to maintain the extended state of the door handle 5 after it has been extended from the door 7, as shown in FIG. 3.

That is, in order to maintain the extended state of the door handle 5 after the second pyro device 19 instantaneously extends the door handle 5 from the door 7 using explosive force and to prevent the door handle 5 from retracting into the door 7 before it is used, the latch mechanism 21 is provided to continuously hold the door handle 5 in its extended position from the door 7, with the piston 23 of the second pyro device 19 continuously pushing the door handle 5 once it has been extended.

Meanwhile, the first energy-amplifying actuator 3 or the second energy-amplifying actuator 9 may also use other devices such as those that are equipped with a chamber storing compressed gas internally to generate the required mechanical displacement with upon an electrical signal provided by the controller 11.

The controller 11 is provided with a stop confirmation sensor 25 capable of verifying the stop state of the vehicle.

Therefore, even in the event of severe damage to the vehicle due to a collision or other accidents, the controller 11 may autonomously make an accurate determination on whether the vehicle has come to a stop following a collision accident via the stop confirmation sensor 25.

The stop confirmation sensor 25 may be composed of at least one of an acceleration sensor 27 and a gyroscope sensor 29 that is capable of measuring the presence of vehicle movement.

That is, the stop confirmation sensor 25 may be composed of one or both of the acceleration sensor 27 and the gyro sensor 29 to determine a stop state based on one or a combination of the vehicle's acceleration being zero and all directional angular velocities of the vehicle being zero.

The controller 11 is connected to the vehicle power supply 13 and may be configured to operate, when possible receiving power therefrom normally, with power supplied from the vehicle power supply 13 and, when impossible receiving power therefrom, with power from the emergency power supply 15.

Here, the vehicle power supply 13 refers to a comprehensive device that supplies power to various devices necessary for the vehicle, which may be interpreted to include not only high-voltage or low-voltage batteries installed in electric or hybrid vehicles but also various power conversion devices.

To ensure sufficient reliability such that the connection between the controller 11 and the emergency power supply 15 is not disconnected even in the event of a collision, it is preferable for the emergency power supply 15 to be physically integrated or closely located with the controller 11, and small batteries may be used as the emergency power supply 15.

The controller 11 may be configured to automatically receive power from the emergency power supply device 15 when the voltage of the power supplied from the vehicle power supply 13 to the controller 11 falls below a certain level.

The controller 11 may be configured to determine, upon receiving information about occurrence of a collision while the vehicle is in motion, whether the vehicle is in a stop state based on the signal from the stop confirmation sensor 25 and activate, when it is determined that the vehicle is in a stop state, the first energy amplification actuator 3 and the second energy amplification actuator 9.

The controller 11 may be configured to detect the occurrence of collision of the vehicle based on a signal transmitted through an in-vehicle communication network, determine, upon detection, whether the vehicle is in a fully stopped state via the stop confirmation sensor 25, and activate the first and energy amplification actuators 3 and 9 only when the vehicle is in the fully stopped state, in order to prevent situations where the door 7 may open before the vehicle stops moving after a collision, putting the occupants at greater risk.

The controller 11 may be configured to set, upon receiving information about occurrence of abnormality of the vehicle power supply 13 while the vehicle is in motion, an expected stopping time of the vehicle based on the current speed of the vehicle, determine, when the power of the vehicle power supply 13 cannot be used after the expected stopping time has elapsed, whether the vehicle is in a stop state based on a signal from the stop confirmation sensor 25, and activate, when it is determined that the vehicle is in the stop state, the first energy amplification actuator 3 and the second energy amplification actuator 9.

That is, when the power from the vehicle power device 13 is completely cut off after detecting an abnormality such as leakage, disconnection, or immersion, the controller 11 sets the expected stopping time of the vehicle based on the current speed of the vehicle, primarily assume, when the expected stopping time elapses, that the vehicle has stopped, determine whether the vehicle has come to a stop completely via the stop confirmation sensor 25, and activate, when it is secondly determined that the vehicle has come to a stop, the first energy amplification actuator 3 and the second energy amplification actuator 9) to release the door lock mechanism 1 and extend the door handle 5.

In other words, when the power from the vehicle power supply 13 is still available after the expected stopping time has elapsed from the detection of an abnormality of the vehicle power device 13, the controller 11 may wait for the normal operation of the door lock mechanism 1 and the door handle 5 instead of activating the first energy amplification actuator 3 and the second energy amplification actuator 9.

Figure 5:
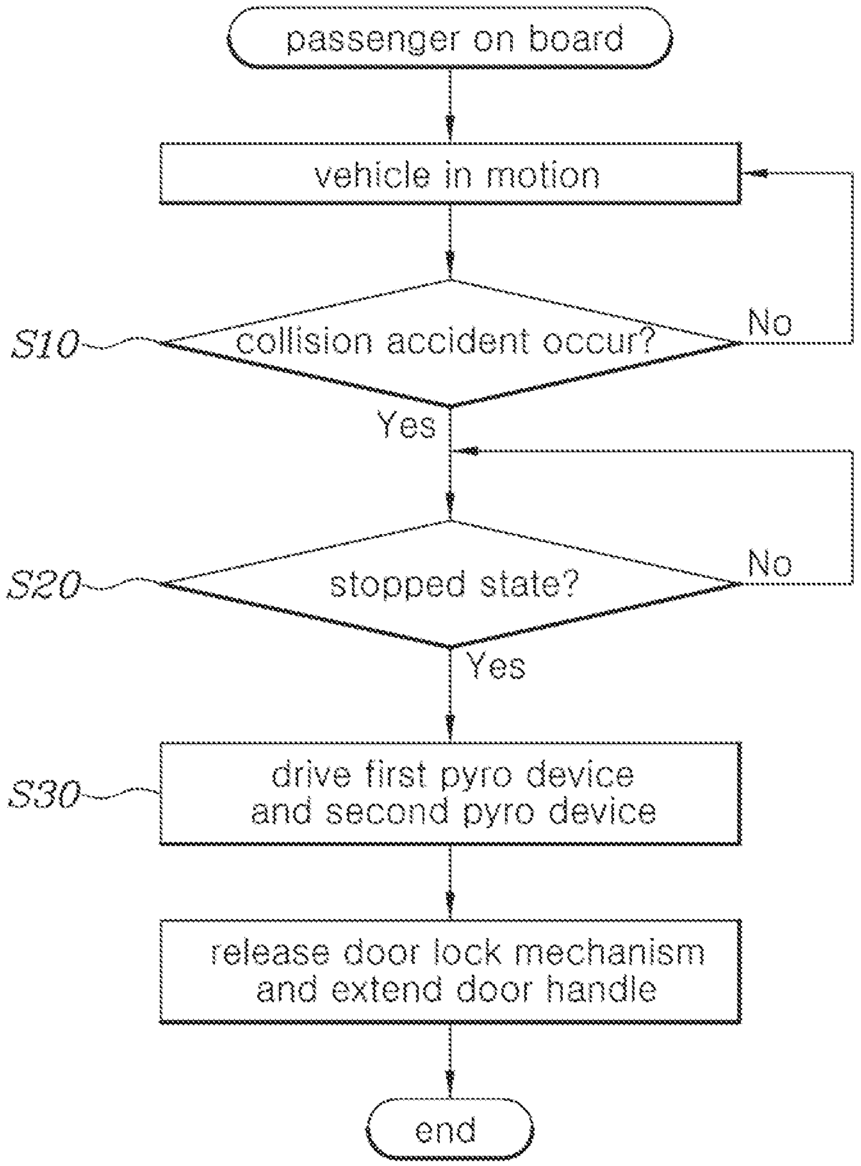
FIG. 5 is a flowchart illustrating the first embodiment of a method of controlling a door handle emergency extension system of a vehicle according to the present invention.

With reference to FIG. 5, a method of controlling a door handle emergency extension system according to an embodiment of the present invention includes monitoring at step S10 whether a collision occurs while a vehicle is in motion, determining at step S20 whether the vehicle is in a stop state after occurrence of a collision, and activating at step S30 the first energy-amplifying actuator 3 and the second energy-amplifying actuator 9 to release the door lock mechanism 1 and extend the door handle 5 from the door 7 when it is determined that the vehicle is in a stop state.

At step S10 of monitoring whether a collision occurs in the vehicle, the signal from a shock sensor 33 equipped in an airbag system 31 of the vehicle may be received through the in-vehicle communication network to determine the collision of the vehicle.

It may also be possible for the controller 11 to receive information provided by an airbag system 31, which processes the signal from the shock sensor 33, through the in-vehicle network for monitoring where a collision occurs in the vehicle.

At step S20 of determining whether the vehicle is in a stop state, the stop state determination may be made based on based on a combination of at least one of signals from the acceleration sensor 27 and the gyro sensor 29 integrated with the controller 11.

Figure 6:
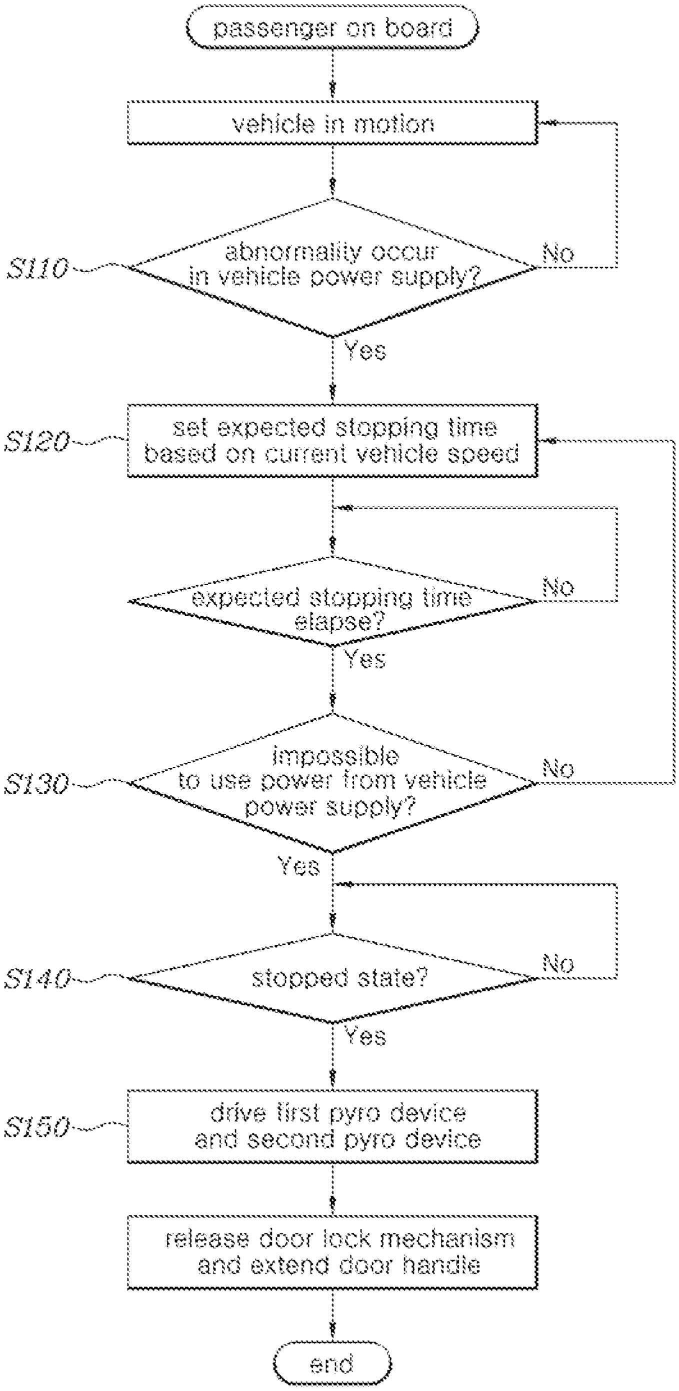
FIG. 6 is a flowchart illustrating the second embodiment of a method of controlling a door handle emergency extension system of a vehicle according to the present invention.

With reference to FIG. 6, a method of controlling a door handle emergency extension system according to an embodiment of the present invention includes monitoring at step S110 whether an abnormality occurs in the vehicle power supply 13 while the vehicle is in motion, setting at step S120 an expected stopping time of the vehicle based the current vehicle speed when an abnormality occurs in the vehicle power supply 13, determining at step S130 whether the power of the vehicle power supply 13 is unavailable for use when the expected stopping time has elapsed, determining at step 140 whether the vehicle is in a stop state when it is determined that the power of the vehicle power supply 13 is unavailable, and activating at step S150 the first energy-amplifying actuator 3 and the second energy-amplifying actuator 9 when the vehicle is in a stop state.

The expected stopping time of the vehicle based on the current speed of the vehicle may be set to increase proportionally with the speed magnitude of the vehicle.

For example, the expected stopping time may be set to 20 seconds for the current vehicle speed of 80 kph and 25 seconds for the current vehicle speed of 100 kph.

When it is determined that the power of the vehicle power supply 13 is available for use at the point when the expected stopping time has elapsed, the expected stopping time of the vehicle based on the current speed of the vehicle is reset, and the vehicle power supply 13 is continuously monitored while waiting for the door lock mechanism 1 and door handle 5 to works normally.

In contrast, when it is determined that the power of the vehicle power supply 13 is not available, it is preferable to switch the operating power of the controller 11 to the emergency power supply 15.

Although the present invention has been illustrated and described in connection with a specific embodiment, it will be obvious to those skilled in the art that various modification and changes can be made thereto without departing from the spirit of the invention or the scope of the appended claims.

What is claimed is:

1. An emergency vehicle door handle extension system of a vehicle, the vehicle comprising (1) a door locking mechanism configured to lock a door of the vehicle, (2) a door handle configured to, when extended outwardly from the door, facilitate opening of the door, and (3) a vehicle power supply device configured to power the vehicle and the emergency vehicle door handle extension system, the emergency vehicle door handle extension system comprising:

a first energy-amplifying actuator configured to release the door locking mechanism;

a second energy-amplifying actuator configured to extend door handle outwardly from the door, a controller configured to drive the first and second energy-amplifying actuators to facilitate opening of the door when the vehicle stops moving and the door handle is not extended outwardly; and an emergency power supply device configured to supply power to the controller independently of the vehicle power supply device of the vehicle, wherein the controller is connected to the vehicle power supply device and configured to:

operate with power from the vehicle power supply device when the power from the vehicle power supply device is available; and operate with the power from the emergency power supply device when the power from the vehicle power supply device is not available, and wherein the controller is further configured to:

in response to detecting an abnormality in the vehicle power supply device, set an expected stopping time of the vehicle based on a current speed of the vehicle;

in response to the power from the vehicle power supply device being unavailable at a time point after the expected stopping time has elapsed, determine whether the vehicle has stopped moving; and in response to determining that the vehicle has stopped moving, drive the first and second energy-amplifying actuators.

2. The emergency vehicle door handle extension system of claim 1, wherein the first energy-amplifying actuator comprises a first pyro device configured to generate, based on an electrical signal from the controller, explosive power to release the door locking mechanism.

3. The emergency vehicle door handle extension system of claim 2, wherein the second energy-amplifying actuator comprises a second pyro device configured to generate, based on the electric signal from the controller, explosive power to extend the door handle outwardly from the door.

4. The emergency vehicle door handle extension system of claim 3, wherein the second pyro device comprises a latch mechanism configured to, in response to the door handle being extended outwardly from the door, maintain the door handle in an extended state.

5. The emergency vehicle door handle extension system of claim 1, wherein the controller comprises a stop confirmation sensor configured to detect whether the vehicle has stopped.

6. The emergency vehicle door handle extension system of claim 4, wherein the stop confirmation sensor comprises at least one of an acceleration sensor and a gyro sensor.

7. The emergency vehicle door handle extension system of claim 5, wherein the controller is configured to:

in response to detecting an occurrence of a collision of the vehicle, determine whether the vehicle has stopped based on a signal from the stop confirmation sensor; and in response to determining that the vehicle has stopped, driving the first and second energy-amplifying actuators.

8. A method of controlling an emergency vehicle door handle extension system of a vehicle, the vehicle comprising (1) a door locking mechanism configured to lock a door of the vehicle, (2) a door handle configured to, when extended outwardly from the door, facilitate opening of the door, and (3) a vehicle power supply device configured to power the vehicle and the emergency vehicle door handle extension system, the emergency vehicle door handle extension system comprising (1) a first energy-amplifying actuator configured to release the door locking mechanism, (2) a second energy-amplifying actuator configured to extend the door handle outwardly from the door of the vehicle, and (3) an emergency power supply device configured to supply power to the emergency vehicle door handle extension system independently of the vehicle power supply device, the method comprising:

monitoring whether an abnormality has occurred in the vehicle power supply device;

in response to detecting that the abnormality has occurred in the vehicle power supply device, set an expected stopping time of the vehicle based on a current speed of the vehicle;

determining whether power from the vehicle power supply device is available at a time point after the expected stopping time of the vehicle has elapsed;

in response to determining that the power from the vehicle power supply device is not available, determining whether the vehicle is in motion; and in response to determining that the vehicle is not in motion, drive the first and second energy-amplifying actuators, wherein the method further comprises, in response to determining that the power from the vehicle power supply device is unavailable, powering the emergency vehicle door handle extension system with power from the emergency power supply device.

9. The method of claim 8, wherein setting the expected stopping time of the vehicle comprises increasing the expected stopping time of the vehicle proportionally to a speed of the vehicle.

10. The method of claim 8, further comprising, in response to determining that the power from the vehicle power supply device is available at the time point after the expected stopping time of the vehicle has elapsed, resetting the expected stopping time of the vehicle based on a current speed of the vehicle.

* * * * *